US008015441B2

(12) United States Patent
Desai et al.

(10) Patent No.: US 8,015,441 B2
(45) Date of Patent: *Sep. 6, 2011

(54) VERIFICATION OF COMPUTER BACKUP DATA

(75) Inventors: Asit A. Desai, San Ramon, CA (US); Antony E. Boggis, Kentfield, CA (US)

(73) Assignee: EMC Corporation, Hopkinton, MA (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/346,898

(22) Filed: Feb. 3, 2006

(65) Prior Publication Data

US 2007/0186127 A1    Aug. 9, 2007

(51) Int. Cl.
*G06F 11/00* (2006.01)
(52) U.S. Cl. ............... 714/6.3; 714/2; 714/5.1; 714/52; 711/162
(58) Field of Classification Search ............. 714/5, 6, 714/52, 54, 5.1, 6.3, 6.2
See application file for complete search history.

(56) References Cited

U.S. PATENT DOCUMENTS

| | | | |
|---|---|---|---|
| 5,719,885 A * | 2/1998 | Ofer et al. ................. | 714/6 |
| 5,778,394 A * | 7/1998 | Galtzur et al. ............. | 707/205 |
| 6,397,309 B2 * | 5/2002 | Kedem et al. ............. | 711/162 |
| 6,480,970 B1 * | 11/2002 | DeKoning et al. ........ | 714/6 |
| 7,315,976 B2 * | 1/2008 | Holt ........................... | 714/769 |
| 7,529,834 B1 * | 5/2009 | Birrell et al. .............. | 709/226 |
| 2005/0283662 A1 * | 12/2005 | Li et al. ...................... | 714/13 |
| 2006/0184764 A1 * | 8/2006 | Osaki ......................... | 711/216 |
| 2006/0242489 A1 * | 10/2006 | Brockway et al. ......... | 714/718 |

* cited by examiner

*Primary Examiner* — Yolanda L Wilson
(74) *Attorney, Agent, or Firm* — Barry N. Young

(57) ABSTRACT

A backup method for a computer system network avoids generating hashes from data that may be inaccurate due to network errors affords verification of source data written to backup media includes reading at a network client a portion of the source data from a source storage volume and generating a hash of the source data at the client. The source data and hash are transmitted to a backup server and written to the backup media. The hash is written to the backup media is associated with the backup data corresponding to the source data from which the hash was generated. Verification of the backup data is performed by reading the backup data from the backup media, generating a hash from the backup data read, and comparing that hash with the hash originally stored on the backup media. This enables the backup data to be verified as corresponding to the original source data without the necessity of rereading the source data from the source volume, and enables faster, more accurate off-line verification subsequent to the backup process.

14 Claims, 5 Drawing Sheets

VERIFICATION OF COMPUTER BACKUP DATA

CROSS REFERENCE TO RELATED APPLICATIONS

This application is related to commonly-owned co-pending application filed concurrently herewith and entitled "Fast Verification of Computer Backup Data" application Ser. No. 11/347,759.

BACKGROUND OF THE INVENTION

This invention relates generally to methods and systems for backing up computer data in computer systems, and more particularly to methods and systems for verifying the accuracy and integrity of backup data in computer networks.

Computer systems store data that is unique and often critical, and, if lost, the data would frequently be expensive, difficult or impossible to replace. The data is normally stored on hard disks or other storage technology which is subject to the possibility of failure. Additionally, data may also be lost by theft, fire or other disaster, and frequently the data loss is permanent. Accordingly, backup methods and systems have been developed to maintain controlled redundancy of data to enable data to be recovered in the event of a disaster to avoid or minimize the loss of the data.

Backup systems copy source data from a computer source volume to backup media so that if the original source data is lost, it may be restored from the backup copy. Since data in a computer system is continuously being created or modified, it is important that the backup process be performed frequently to ensure that the backup copy of the data is reasonably current. Most backup operations are batch-oriented and performed at predetermined times during a backup window, such as at night when the computer systems are not being used for normal processing operations. This is particularly the case for systems which backup data in computer networks of large enterprises that have many different computers and many different source storage volumes to backup.

In enterprises having computer networks comprising many different computers and source volumes, backup may be distributed among one or more central backup servers having multiple back up media. For example, backup servers and media may be distributed across a LAN, a MAN or even a WAN, and backup may require data transfers across such networks to the distributed backup media. As is well known, network data transfers are susceptible to errors because of the network. Such errors result in invalid data being copied to the backup media, and limit the usefulness of the backup set in the event data needs to be restored.

Because of the importance of backup data, it is necessary that an accurate backup data set be maintained. Accordingly, in addition to copying the source data to the backup media, it is normally required that backup data be verified after copying the source data to backup media. Verification ensures that the source data was copied correctly so that an accurate backup set is maintained, and verification is normally included as part of a backup process.

Known verification systems and methods involve comparing the backup data in the backup set with the original source data to determine whether the two sets of data match. Verification is usually done right after the source data is copied to the backup media. If the backup set spans multiple media, for example tapes or discs, in order to perform verification it is necessary to remount all members of the backup media comprising the backup set to perform verification. This increases substantially the time and overhead burden of the backup and verification processes, and may prevent backup from being completed during the scheduled backup window. Accordingly, a system administrator may be able to perform only a partial backup during the backup window, backing up only some of the source volumes which need to be backed up. Otherwise, the administrator may be required to forego the verification process, which is undesirable, or extend the backup window into the period of normal operations, running the risk of disrupting normal operations or trying to backup files as they are being changed, which is also undesirable. If the source file changes between the time it was backed up and the time verification is performed, a "miscompare" will occur even if the original source file was correctly copied to the backup media, causing verification to fail.

Verification is usually performed by a backup server. Accordingly, even if the original source data has not changed, errors can occur in rereading the original source data and backup data and transmitting the data to the backup server for comparison. This is particularly a problem with data transfers over a network to a central backup server. If transmission errors occur, the "reread" original source data will be invalid and when compared with the backup data on the backup media, verification will fail even if the source data was originally copied correctly to the backup media. The backup data will be indicated to be invalid, and this will necessitate recopying the source data, usually during a subsequent backup process, resulting in inefficiencies. Moreover, until recopied, this will render the backup data unreliable and of little or no value should a disaster occur and recovery be necessary. An error may also occur during the transmission of the original source data for backup, resulting in the backup data being inaccurate.

Errors can also occur during data transfer operations other than backup, and a verification process is desirable to ensure accurate transfer. For example, it is desirable to verify the integrity of data read from the backup media and copied to another media, as for archiving or making a duplicate copy of the backup data, or for a restore in the case of a failure of the source media. These operations involve the same difficulties as those encountered during verification of backup.

It is desirable to provide backup methods and systems which avoid the foregoing and other problems of known backup approaches by affording backup and verification processes that are efficient, accurate, and more reliable for verification of backup data and data transfers, especially over networks. It is to these ends that the present invention is directed.

DESCRIPTION OF PREFERRED EMBODIMENTS

The present invention is particularly well adapted to backing up multiple computers in a computer system network, and will be described in that context. As will be appreciated, however, this is illustrative of only one utility of the invention, and the invention has broader applicability to data storage, handling and transfer operations more generally.

Figure 1:
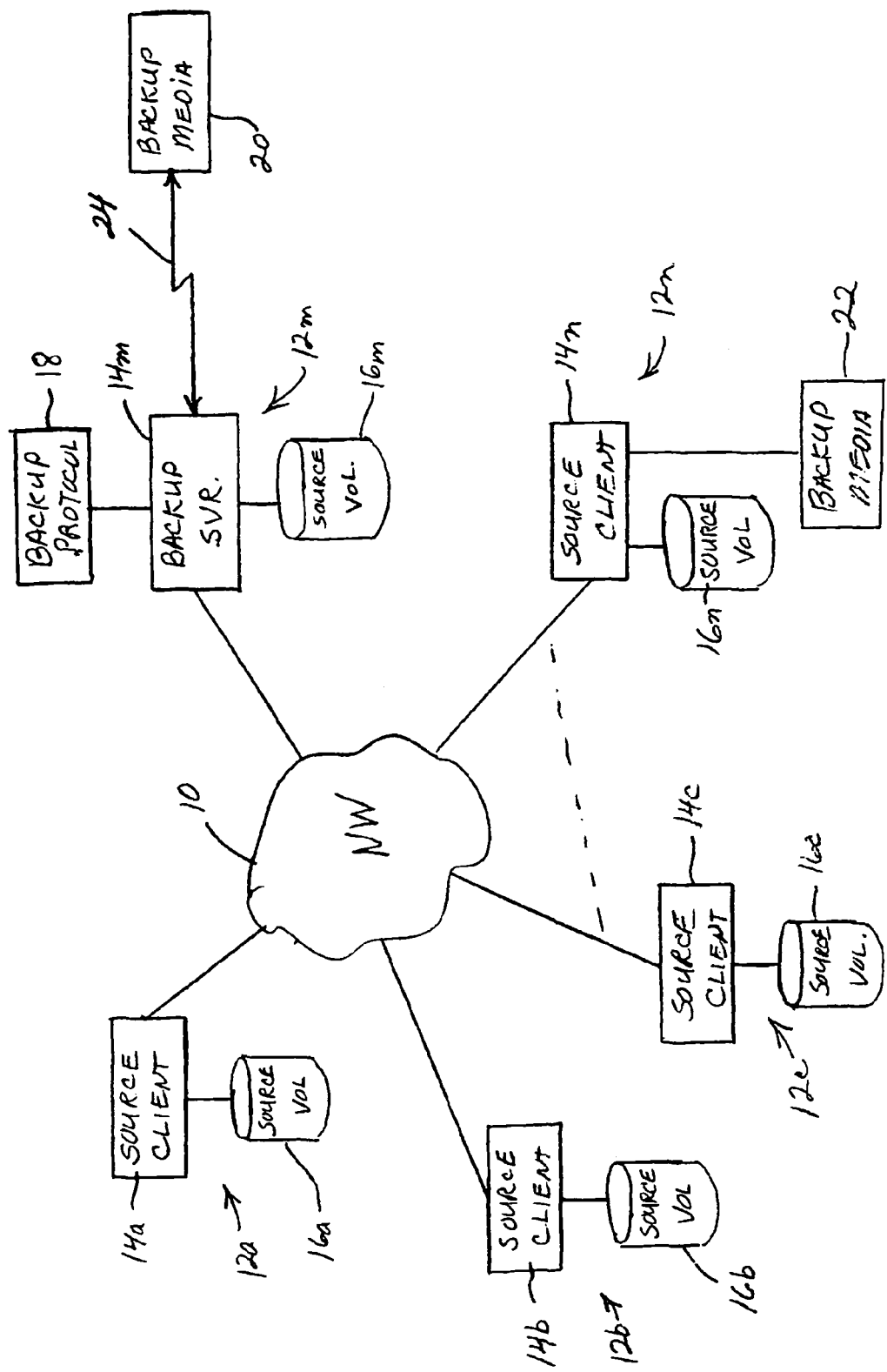
FIG. 1 is a block diagram of a computer system of the type with which the invention may be employed.

FIG. 1 is a block diagram of a computer system network 10 of the type with which the invention may be employed. As shown, the network may comprise a plurality of computer systems 12a, 12b, . . . 12m connected together in a network. Computer systems 12a-12n may each comprise a source client computer 14a-14n and one or more source data storage volumes 16a-16n, which may be hard disks, for example. The source clients may be either the same type of computer or different computers. They may be, for instance, desktop computers, mobile computers such as laptops, or server computers. Although only one source volume is shown in FIG. 1 connected to a client, it will be appreciated that a client may have multiple source volumes, and that a source client computer may in fact be a storage server that manages a group of interconnected storage volumes. Computer system 12m may be a backup computer system that affords centralized backup management for the network. The backup computer system may simply comprise another computer on the network, referred to herein as a backup server, that is similar to the source client computers. The backup server may execute a backup software program (protocol) comprising machine executable instructions stored on a computer readable media 18 that controls the server to perform a backup method in accordance with a preferred embodiment. Source client computers 14a-14n may also execute client software applications as part of the backup method that are included on computer readable media 18 and installed on the source clients by the backup server.

As will be described, the backup method copies source data from the source volumes 16a-16m to one or more backup media 20, 22. The backup media may comprise tape, hard disks or CD/DVD discs, for example. As shown, the backup server 12m may itself have a source data volume, 16m, and the backup media may be distributed across the network, comprising, for example, backup media 20 accessible by the backup server and other backup media connected to client computers, such as backup media 22 connected to client computer 14n. Backup media 20 may be local backup media connected to the backup server, or it may be located on a different network as part of a centralized enterprise backup system that is accessible by the backup server via a high speed connection 24.

The backup protocol may comprise not only the backup software programs which control the server and clients to copy source data from the source volumes to the backup media and perform verification of the backup data, but may also comprise backup scripts which prescribe different types of backup operations and different times at which the backup operations are performed. For example, in the case of a network with a large number of source clients and a large number of source volumes to be backed up, the backup protocol may direct the backup server to perform a normal backup operation daily as, for example, during the night, to copy only source data which has changed since the last backup. Then, over weekends or holidays when normal computer operations are not being conducted, the backup server may perform a full backup and copy all source files to the backup media.

As will be appreciated, while the preferred embodiment has its greatest utility in connection with backing up source volumes on a network, it is also applicable to a computer system comprising a single computer and a single source volume, such as backup server 14m and source volume 16m, where the computer runs the backup protocol and backs up its own source volume to the backup media. As indicated before, network 10 may be a local area network (LAN) or a subnet of a wide area network (WAN) comprising a plurality of local area networks or subnets, each having its own backup server and executing its own backup protocol. Furthermore, backup server 12m may backup source data from other networks that are connected to network 10.

Figure 2:
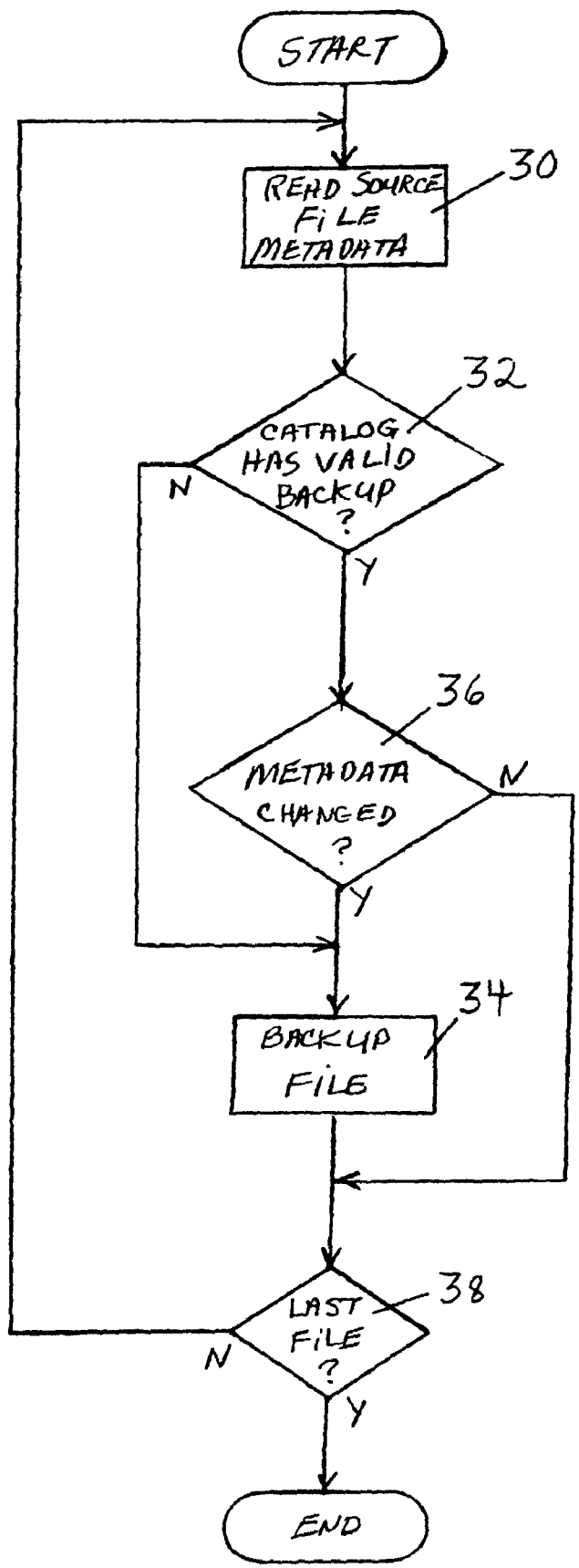
FIG. 2 is a flowchart illustrating an overview of a preferred embodiment of a backup process.

FIG. 2 gives an overview of a preferred embodiment of a backup process which may be embodied in the backup protocol 18. The process illustrated in FIG. 2 backs up source data files that are either newly created or that have changed or been modified since they were last backed up. The process begins at 30 by a source client reading the metadata of a source data file from a source storage volume. Next, at 32, the process determines whether there is a valid backup of the source file. It may do this by looking to a catalog which may be stored in the backup server for metadata corresponding to the source file. As will be described, the catalog provides an index of the files that are stored on the backup server and certain information about the files, such as when the backup file was written to the backup media. By comparing the metadata of the source file read at step 30 with the catalog, the process determines whether there is a valid backup of the source file, i.e., a backup that did not previously miscompare, as will be explained shortly. If a valid backup of the file does not exist, the file is backed up at 34. If a valid backup does exist, at step 36 a determination is made as to whether the metadata of the source file has changed. If the metadata has changed, this indicates that the file has changed since its last update, and the process proceeds to step 34 where the file is backed up to the backup media.

Next, the backup process looks to determine whether the file was the last file of the source volume at step 38. If it was the last file, the process ends. If the file was not the last file, the process returns to step 30 where the next file on the source volume is read and the process is repeated. The backup process continues until all files of a source volume have been inspected and backed up if necessary. The process may then be repeated, according to predetermined scripts, for each subsequent source volume of each source client until all files of all source volumes have been inspected and backed up.

The catalog to which the backup process looks to determine whether there is a valid backup of a file may comprise a data structure Which stores "bookkeeping" information about files. An example of a catalog and the type of information it may contain about source data that may be employed in the invention is described in commonly owned U.S. Pat. No. 5,150,473, the disclosure of which is incorporated by reference herein. Data files stored on source volumes are stored in directories in hierarchical tree structures. The catalog data provides information on the tree structure of each source data file. This information may be written onto the backup media with a copied file to indicate the location of the file on the source volumes and to permit easy identification of files. This information is preferably written onto the source media as a header along with the backup file, as will be described shortly in connection with FIG. 4.

Figure 3:
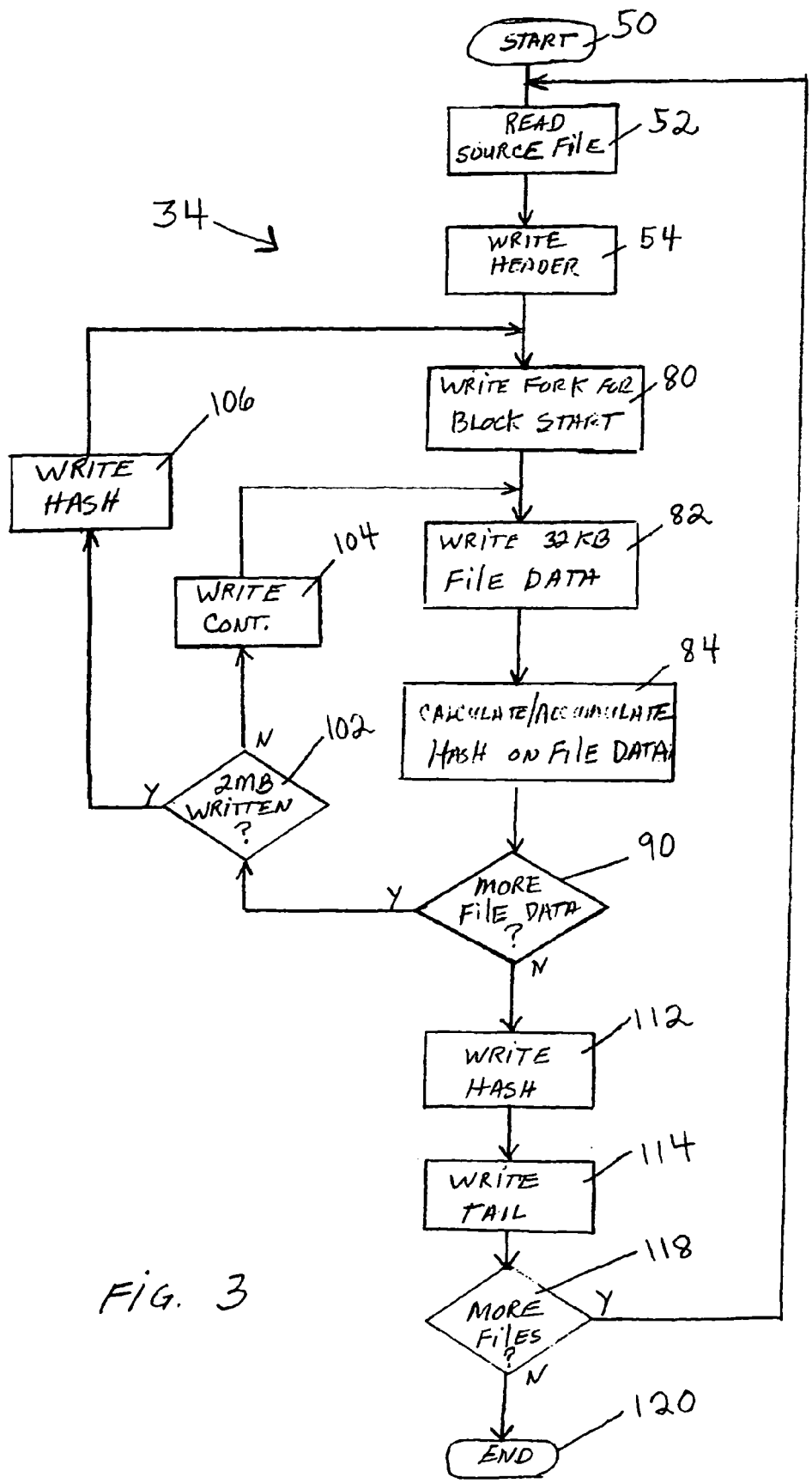
FIG. 3 is a flowchart illustrating in more detail the backup process of FIG. 2.
Figure 4:
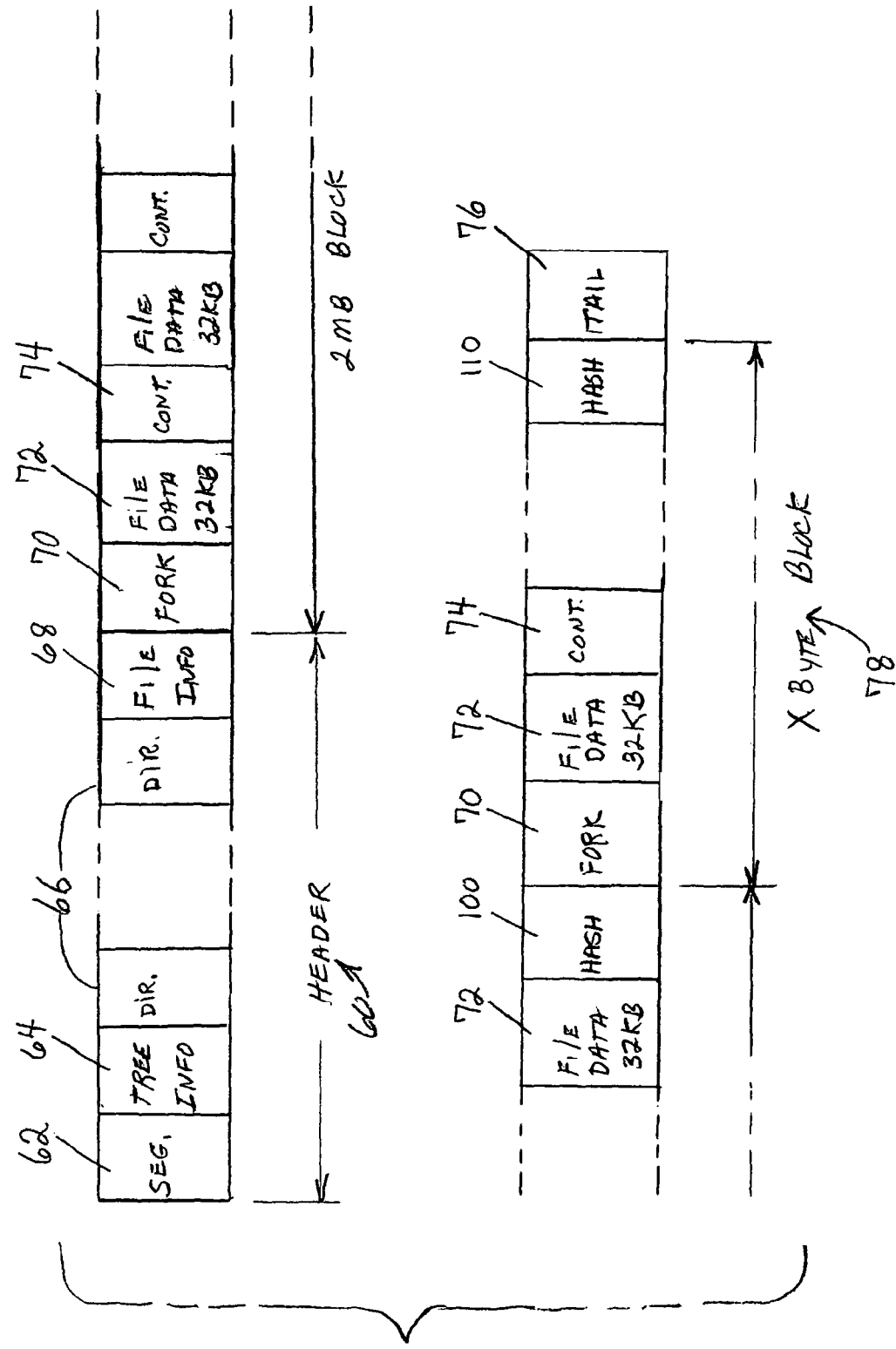
FIG. 4 is a diagrammatic view of a preferred backup data format used in the backup process.

FIG. 3 illustrates in more detail the file backup step 34 of FIG. 3 for copying a source file from the source volume to the backup media. FIG. 4 illustrates a preferred backup data format on the backup media. Referring to FIG. 3, the process for backing up the file starts at step 50. At step 52, a source file is read from the source volume by a corresponding source client computer, and at step 54 header information is transmitted to the backup server, which writes a header 60 (see FIG. 4) to the backup media. As indicated in FIG. 4, the header preferably contains a number of separate records that provide different information about the file, as described in the previously referenced U.S. Pat. No. 5,150,473. As shown, the header records may include a segment record 62 which provides information about the backup segment upon which the data is written, a top information record 64 which provides top information about the file, and a plurality of directory records 66 which provide information on the hierarchical tree structure in which the file is located on the source volume. Next, a file information record 68 may be written that provides specific information about the source file which is being written.

As indicated in FIG. 4, files are preferably written in blocks having a predetermined block length. A preferred length is a block containing a predetermined number of bytes corresponding to, e.g., 2 MB (megabytes) or less, as indicated in FIG. 4, although blocks of any other convenient length may be employed. Depending upon the size of the source file, a plurality of 2 MB blocks containing the backup data will be concatenated on the backup media until the complete file has been copied. The beginning of each 2 MB block may be indicated by a fork record 70 which is used to separate the 2 MB blocks. As indicated in FIG. 4, each 2 MB block will contain a plurality of concatenated records. File data is written preferably in a plurality of sub-blocks (or records) 72 of a predetermined size. Preferably file records 72 have a length of 32 KB, which is a convenient size but other sizes may also be employed as desired. File records 72 are preferably separated by a continuation record 74 to delineate file records. A tail record 76 may be written onto the backup media at the end of the backup data file corresponding to the end of the source data file. Moreover, as indicated in FIG. 4, where the last block of source data requires a block that is less than 2 MB in length, the last backup data block 78 corresponding to that source data block that is written to the backup media will be less than 2 MB.

Returning to FIG. 3, after the header 60 is written at step 54 of the backup process onto the backup media, the backup process then writes a fork record (70) at step 80 to indicate the beginning of the first 2 MB block of backup data. The source client computer may then transmit the first 32 KB source file data record to the backup server, which writes a backup file data record on the backup media at step 82. Next, at step 84, the client generates a hash of the 32 KB block of file data just written, and accumulates the hash with hashes generated from preceding 32 KB file data records (if any) in the 2 MB block. The hash, which may be a conventional MD-5 hash, as will be described in more detail shortly, is used to create a unique identifier for the 32 KB record of source file data. The client may store temporarily the accumulated MD-5 hashes generated from other 32 KB source data records until the end of the 2 MB block of data is reached. Alternatively, it may transmit the hashes as they are generated to the backup server for temporary storage until the backup server writes the accumulated hash to the backup media.

At step 90, the process determines whether there is more source file data. If so, the process branches to step 102 where a determination is made as to whether the size of the block which has been written to the backup media has reached the predetermined block size of 2 MB. If the size of the block of backup data is less than 2 MB, at step 104 a continuation record 74 may be written to the backup media, and the process returns to step 82 where the next 32 KB record of source file data is written by the backup server as backup data. The process then returns to step 84 where the source client computer generates the hash for the next record, and accumulates it with other hashes.

If, at step 102, the size of the block of backup data on the backup media has reached 2 MB, the backup process proceeds to step 106 where the backup server writes the accumulated hash value as a hash record 100 on the backup media, and associates the hash with the 2 MB block. Preferably, this is done by writing the hash following the last 32 KB source file data record, as indicated in FIG. 4, where the hash record 100 is written at the end of the 2 MB block of data. The backup process may then return to step 80 where a fork record 70 is written for the beginning of the next block of data, and the process repeats steps 82, 84 and 90.

At step 90 of the backup process in FIG. 3, if it is determined that there is no additional file data to be written, the backup server proceeds to write and associate a final hash record 110 (see FIG. 4) at step 112 with the last block 78. Next, the backup server may write a tail record 76 at step 114 to indicate the end of the source data file. At step 118, the process determines whether there are any additional source files to be backed up. If there are additional source files, the backup process returns to step 52 and is repeated for the additional files. If there are no additional backup files, the process ends at step 120.

The hash records 100, 110 written at steps 106 and 112, respectively, for each 2 MB block of data may be generated by the source clients using any of a number of different well-known hash algorithms. The purpose of the hash, as indicated above, is to afford a unique identifier of the source data files contained within each 2 MB block, and to readily indicate any difference between the original source data and the backup data on the backup media. As described above, a preferred hash algorithm is the well-known MD-5 hash algorithm. This hash produces a constant length 128 bit (16 byte) hash. The MD-5 hash algorithm is very efficient and can be easily and quickly calculated without imposing undue processing burden on the computer that would slow down the backup process. Moreover, the MD-5 hash results in low collision between two data sets of 2 MB length, i.e., low probability of the same hash value being produced for two data sets.

The overhead for storing MD-5 hashes on the backup media is also small. For large blocks of data of 2 MB, the overhead of 128 bytes per file works out to be only about 13 MB overhead per 200 GB of data. If there are many small files, for example around 2 KB, the overhead is about 13 GB. However for average file sizes, the overhead will typically be of the order of 1%, but in worse case may be as much as 5%. Other hashes which may be employed, but are less preferable, include the SA-1 hash and the CRC-32 hash. The SA-1 hash is more computer intensive to generate than the MD-5 hash, and can slow down the backup process. The CRC-32 hash is easy to generate, but is less secure and is less capable of detecting small variations between two data sets.

After the source data has been written to the backup media, it is desirable to verify the accuracy and integrity of the source data files that were copied as backup files to the backup media. Previously, in conventional processes, verification has required rereading the original source data from the source volume, and comparing it with the backup data on the backup media. As explained above, such verification processes are time consuming and inconvenient because they require access to the original source data on the source volume.

Figure 5:
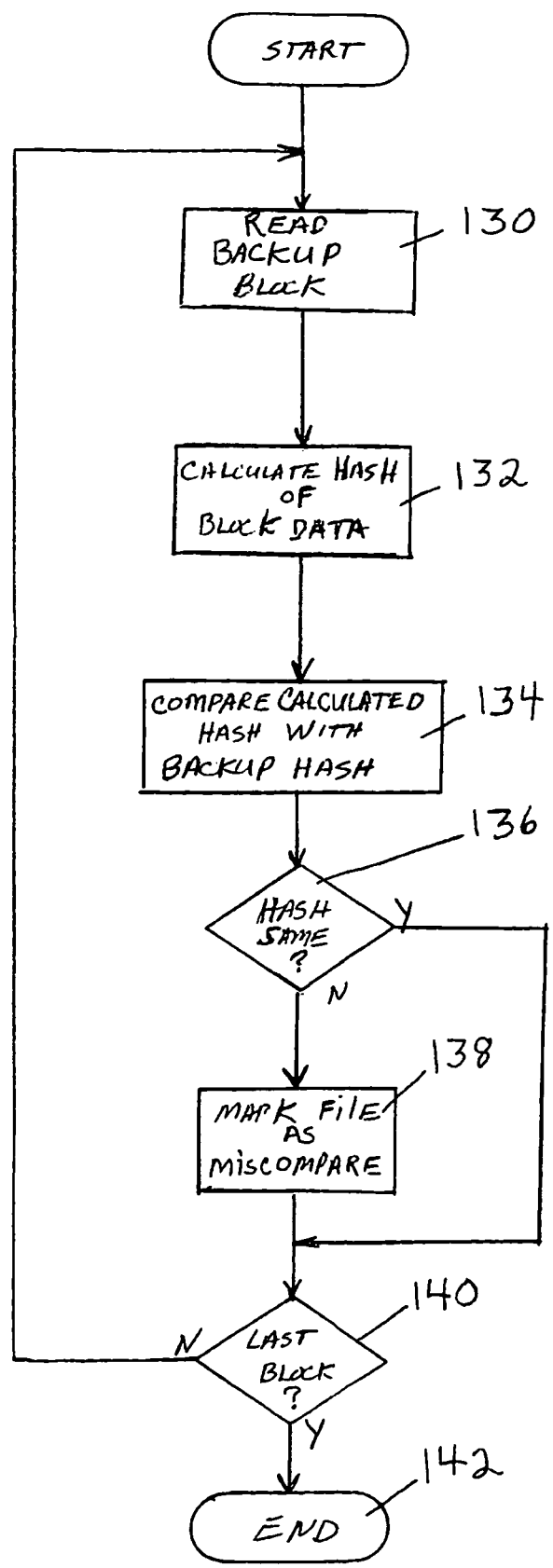
FIG. 5 is a flowchart illustrating a preferred embodiment of a verification process.

The preferred embodiment avoids these difficulties by providing a verification process that obviates the need to access the original source data for verification. In fact, verification may be performed completely and reliably by the backup server, or by any other computer with access to the backup media, and may be performed off-line at any time subsequent to the source data being backed up. This is accomplished, as will be described, by using the hashes which are written on the backup media during the backup of source data. FIG. 5 is a flowchart of a preferred embodiment of a verification process.

As shown in FIG. 5, verification begins at step 130 where a block (e.g., 2 MB) of backup data is read from the backup media. As the backup data is read, a hash is generated at step 132 for each 32 KB record of backup data using the same algorithm which produced the original hash, i.e., the MD-5 algorithm, and the hashes are accumulated for the records until the end of the 2 MB block of data is reached. This process may be similar to the process described above by which the hashes were generated and accumulated during the backup process illustrated in FIG. 3. The accumulated hash is then compared at step 134 (FIG. 5) of the verification process with the hash that was generated from the original source data, and written to the backup media and associated with the corresponding backup file on the backup media during the backup process. At step 136, a determination is made as to whether the two hashes are the same. If the hash generated from the backup data matches the hash generated from the original source data and written to the backup media, this indicates that the backup data is accurate and the process proceeds to step 140. If the hashes do not compare, the backup file is marked at step 138 as a "miscompare", and the original source data file will be recopied to the backup media, for example, during a subsequent backup process. At step 140, the verification process determines whether there are any additional blocks to be verified. If so, the process returns to step 130 and verification is repeated for the additional blocks backup data. If there are no additional blocks, the process ends at step 142.

As will be apparent from the foregoing, since the hash written on the backup media is generated from the original source data at the time the original source data is read from the source volume, the hash accurately reflects the original source data at the time it was read. Accordingly, verification can be performed at any time after the original data was copied to the backup file without the necessity of accessing the original source data. This enables verification to be performed off line, and even when the original source data is not available.

More importantly, however, since the hash is generated by the source client on the original source data as it existed on the source volume at the time of backup, there is a high degree of assurance that the hash accurately characterizes the original source data. It is well known that data transmissions over networks are subject to errors due to the network. Thus, if the hash were generated at the backup server or at another computer following transmission over the network, there is a risk that the hash would be generated from data containing errors, and that these errors would go undetected. Since the invention generates the hash at the source client, this situation is avoided, and the verification process is more reliable.

The preferred embodiment also advantageously affords more accurate and reliable verification of data transfer operations for other than just backup. For example, data transferred from backup media for a restore process, or to copy the backup data to another archive media, or to make another copy of the backup set may be performed and verified to ensure the integrity and accuracy of the data transfer. In this way, the administrator can be assured that all copies of the backup data are accurate and correspond to the original source data without the necessity of performing a conventional backup and verification process. This may be accomplished by using the backup data on the backup media as analogous to source data on a source volume, generating a hash from the backup data read and transferred to the copy, and comparing this generated hash to the hash that was produced from the original source data and stored on the backup media with the backup data transferred.

While the foregoing description of the invention has been with reference to a preferred embodiment, it will be appreciated by those skilled in the art that changes in this embodiment may be made without departing from the principles and spirit of the invention, the scope of which is defined by the appended claims.

The invention claimed is:

1. A method of backing up source data from a source storage volume of a source computer to backup media, comprising: reading at least a portion of the source data from the source storage volume; generating by the source computer a hash of the source data as the source data is read from the source volume; transmitting the source data and hash to said backup media; writing the source data to said backup media as backup data; writing the hash to the backup media; associating the hash on the backup media with the backup data corresponding to the source data from which the hash was generated; reading the backup data and the hash from the backup media by a backup server that controls the back up media; generating by the backup server another hash from the backup data read from the backup media; comparing by the backup server the hash read from the backup media with the other hash generated by the backup server to verify the integrity of the backup data; and upon said compared hashes not matching, marking the backup data as miscomparing, rereading by a source computer the source data corresponding to the miscompared backup data media from the associated source volume, and rewriting the source data to the backup media with a new hash generated from the reread source data by the source computer.

2. The method of claim 1, wherein said transmitting comprises transmitting the source data and hash to said backup server, said backup server writing of the source data and hash to said backup media, and said backup server verifying the integrity of the source data on said backup media without accessing either the source computer or the source data.

3. The method of claim 2, wherein said source computer and backup server are connected by a computer network comprising a plurality of interconnected source computers, each having one or more associated source volumes, and wherein each source computer transmits a portion of source data read from an associated source volume and a hash generated by such source computer from said read source data over said network to said backup server for writing on said backup media.

4. The method of claim 1 further comprising generating by the source computer of the associated source volume said new hash of the reread source data, and transmitting said new hash to the backup media for association with backup data corresponding to said reread source data.

5. The method of claim 4, wherein said reread source data comprises a block of data, and said associating said hash comprises writing said new hash on the backup media for said block of data with such block.

6. The method of claim 1, wherein said portion of source data comprises a data file having one or more blocks of data, and said generating comprises generating a hash for each of said blocks.

7. The method of claim 6, wherein each of said blocks of data comprises a plurality of file data records, and wherein said generating comprises generating a hash for each of said records, and accumulating such hashes to produce an accumulated hash for a block, said accumulated hash comprising said hash of the source data generated by the source computer.

8. A method of backing up source data from a source storage volume of a source computer over a network to backup media controlled by a backup server on said network, comprising: storing the source data on said backup media as backup data with an associated hash of said source data generated by said source computer as the source data is read from the source volume for storing on the backup media, the backup data and the hash being associated with one another on the backup media; reading by the backup server the backup data and its associated hash from the backup media; generating by the backup server another hash from the backup data read from the backup media; comparing by the backup server the associated hash read from the backup media with said other hash generated by the backup server to verify the integrity of the backup data; and upon said compared hashes not matching, marking the backup data as miscomparing to indicate that the source data is to be rewritten from the source volume to the backup media.

9. The method of claim 8 further comprising reading the backup data and its associated hash from the backup media, and copying the backup data and the associated hash to another backup media.

10. Computer readable media comprising instructions executed by a source computer and a backup server of a computer network to perform a backup method to backup source data stored on a source storage volume of said network, the method comprising: reading by said source computer at least a portion of source data from the source storage volume; generating by the source computer a hash of the source data as the source data is read from the source volume; transmitting by the source computer the source data and the hash to said backup server; writing by the backup server the source data and the hash to backup media; associating the hash on the backup media with the backup data corresponding to the source data from which the hash was generated; reading by the backup server the backup data and the hash from the backup media; generating by the backup server another hash from the backup data read from the backup media; comparing by the backup server the hash read from the backup media with the other hash generated by the backup server to verify the integrity of the backup data; and upon said compared hashes not matching, marking the backup data as not comparing to indicate that the source data corresponding to the backup data is to be rewritten to the backup media upon performing a subsequent backup.

11. The computer readable media of claim 10, wherein said portion of source data comprises a data file including a block containing one or more file data records, each having a predetermined length, and wherein said generating comprises generating a hash for each of said data records and accumulating said hashes to produce a hash representing said data file.

12. The computer readable media of claim 11, wherein said associating of the hash with the backup data comprises writing said hash on the backup media for each data file as part of said block.

13. The computer readable media of claim 10, wherein the method further comprises reading metadata associated with said source data; comparing the metadata with metadata in a catalog representing a backup of said source data on the backup media; and the rewriting of the source data to the backup media upon said comparing of metadata indicating that the source data has changed.

14. The computer readable media of claim 10, wherein said computer system comprises a computer network, and said method is performed on a computer of said computer network.

* * * * *